US005553060A

United States Patent [19]
Obermanns et al.

[11] Patent Number: 5,553,060
[45] Date of Patent: Sep. 3, 1996

[54] METHOD FOR MAINTAINING VIRTUAL CONNECTIONS GIVEN AN AT LEAST PARTIAL OUTAGE OF CONNECTING PATHS

[75] Inventors: Sebastian Obermanns, Munich; Richard Schoonhoven, Olching, both of Germany

[73] Assignee: Siemens Aktiengesellschaft, Munich, Germany

[21] Appl. No.: 534,923

[22] Filed: Sep. 28, 1995

Related U.S. Application Data

[63] Continuation of Ser. No. 265,657, Jun. 24, 1994, abandoned.

[30] Foreign Application Priority Data

Jun. 25, 1993 [EP] European Pat. Off. ............. 93110218

[51] Int. Cl.$^6$ .................................................. H04L 12/56
[52] U.S. Cl. ............................... 370/16; 370/54; 370/60; 370/94.1; 340/825.01; 340/827; 379/221
[58] Field of Search ........................... 370/16, 14, 60.1, 370/54, 58.3, 60, 79, 110.1, 94.1, 58.1, 68.1; 340/827, 825.01, 825.03; 379/219, 220, 221

[56] References Cited

U.S. PATENT DOCUMENTS

| | | | |
|---|---|---|---|
| 4,348,554 | 9/1982 | Asmuth | 179/18 |
| 4,802,199 | 1/1989 | Lange et al. | 379/221 |
| 4,884,263 | 11/1989 | Suzuki | 370/16 |
| 5,210,740 | 5/1993 | Anzai et al. | 370/16 |
| 5,307,344 | 4/1994 | Mueller et al. | 370/60 |
| 5,311,502 | 5/1994 | Mueller et al. | 370/60 |

FOREIGN PATENT DOCUMENTS 41 28 939A1  3/1993  Germany.

OTHER PUBLICATIONS

Article presented at IEEE GLOBECOM Telecommunications Conference & Exhibition, Nov. 27, 1989, Dallas, Texas, entitled "Integrated ISDN D–Server For Intelligent Networking", by L. H. Ebertl, and P. Chen.

Article presented at the Apr. 7, 1991 IEEE Infocom 1991, Networking in the 90's, Conference on Computer Communications, by M. A. Bonuccelli title "Minimum Fragmentation Internetwork Routing".

Japanese Patent Abstract JP429–159–5 published Oct. 15, 1992, Virtual Private Network Connecting System.

*Primary Examiner*—Alpus H. Hsu
*Assistant Examiner*—Ricky Q. Ngo
*Attorney, Agent, or Firm*—Hill, Steadman & Simpson

[57] ABSTRACT

A method for setting up virtual connections in packet switching networks is disclosed wherein a virtual connection within a second packet switching network is used to maintain or create a virtual connection between subscriber equipment with a first packet switching network. Signaling equipment located within first packet switching network, but which is not directly connected to the subscriber equipment, employs the signaling protocol of the second packet switching network when initiating the second virtual connection so that it is not necessary for the second packet switching network to recognize a specific signaling protocol.

16 Claims, 1 Drawing Sheet

METHOD FOR MAINTAINING VIRTUAL CONNECTIONS GIVEN AN AT LEAST PARTIAL OUTAGE OF CONNECTING PATHS

This is a continuation, of application Ser. No. 08/265,657, filed Jun. 24, 1994, now abandoned.

BACKGROUND OF THE INVENTION

1. Field of the Invention

The present invention relates to a method for maintaining virtual connections in packet switching networks and more particularly, this invention relates to maintaining virtual connections in packet switching networks when there is partial interruption of the connecting paths.

2. Description of the Prior Art

Various methods of maintaining virtual connections in packet switching networks are known in the art. One such method is disclosed in German Published Application DE 41 28 939. In this method, when there is a partial interruption, the switching equipment connected to the calling subscriber equipment generates a call request that requests the set up of a virtual connection and transmits this to a second packet switching network via a network interface location connected to the switching equipment. In addition to an address field, an address expansion field as well as an information flag are included in the call request. The transmitted call request contains address information in the address field that identifies the network interface location which is necessary for providing the virtual connection. The address expansion field contains information that identifies the called subscriber station which is to be connected with the virtual connection. The address information contained in the address field of the call request indicates the appropriate network interface location for reconnection with the first packet switching network. A connecting path is defined in the second packet switching network to the appropriate network interface location for connection with the first packet switching network and the call request is forwarded to that location. At the network interface location, the address information contained in the address field and address expansion field are exchanged with one another based on the information flag set in the call request. The virtual connection to the switching equipment connected to the called subscriber equipment is set up based on the address information which is now contained in the address field of the call request. This address information identifies the called subscriber equipment.

As discussed above, the method requires that the second packet switching network be compatible with and support the "address expansion" protocol. Every packet switching network, however, cannot be assumed to be compatible with this feature.

It is thus an object of the present invention to maintain a virtual connection via an additional packet switching network wherein the virtual connection is made without requiring that the additional packet switching network be compatible with a particular signaling procedure or protocol.

SUMMARY OF THE INVENTION

In the present invention, a virtual connection is first completely set up in the second packet switching network upon initiation of the signaling procedure employed by this packet switching network. Only an existing connection and the signaling packets are required to reestablish a virtual sub-connection between the switching equipment of the first packet switching network which is connected to the network interface locations. All packets can be transparently transmitted via the alternate route. Thus, there are no specific requirements whatsoever for the signaling protocol within the second packet switching network. Any arbitrary signaling procedure can be utilized in this packet switching network.

DESCRIPTION OF THE PREFERRED EMBODIMENTS

Figure 1:
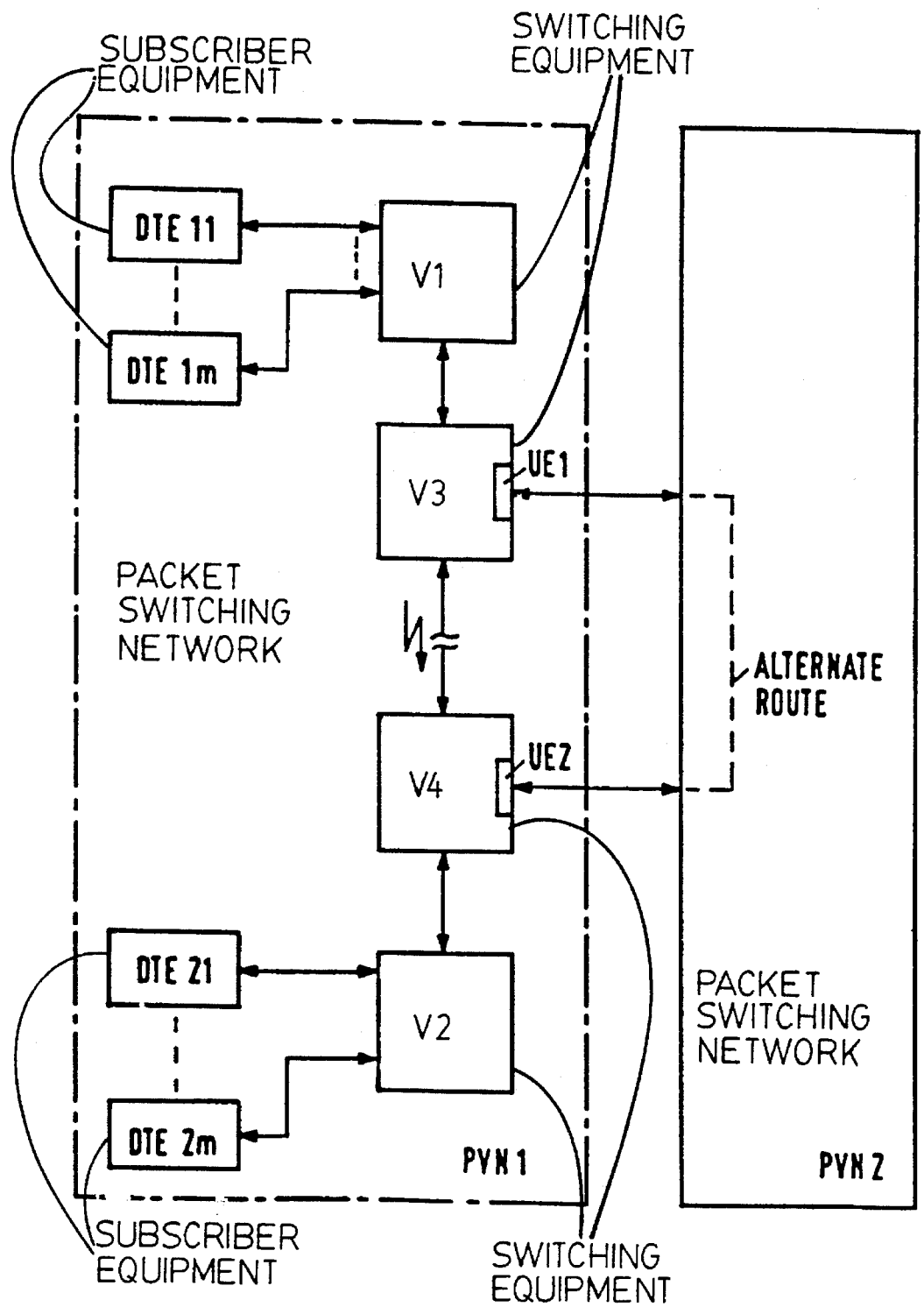
FIG. 1 illustrates a block diagram of a communication system which incorporates the present invention.

FIG. 1 illustrates a block diagram of a communication system which employs packet switching networks connected to one another via network interfaces in accordance with the present invention. The drawing shows two separate packet switching networks PVN1 and PVN2 which are connected to one another via network interface locations UE1 and UE2. Packet switching network PVN1 is a private packet switching network and packet switching network PVN2 is a public packet switching network. Switching equipment V1 and V2 is located within the packet switching network PVN1. A plurality of respective subscriber equipment is connected to the switching equipment V1 and V2. The switching subscriber equipment is referenced DTE11 through DTE1m or, respectively, DTE21 through DTE2m according to their affiliation with the corresponding switching equipment. A transmission of signaling packets for the purpose of setting up virtual connections between the subscriber equipment and the corresponding switching equipment ensues and the subsequent transmission of data packets given existing virtual connections follows according to CCITT Recommendation X.25. Signaling packets and data packets are also exchanged between the two packet switching networks PVN1 and PVN2 over the two afore-mentioned network interface locations UE1 and UE2, according to this CCITT Recommendation.

The switching equipment V1 and V2, which are each capable of carrying out both originating as well as destination switching functions, are in communication with one another via one or more trunk lines. The trunk lines may also be conducted via transit switching centers. Two such transit switching centers are referenced V3 and V4 in FIG. 1. In the present exemplary embodiment, the transmission of signaling packets and data packets ensues according to a trunk protocol based on CCITT Recommendation X.25.

It is assumed in the example below that the network interface location UE1 is provided in the switching equipment V3 and that the network interface location UE2 is provided in the switching equipment V4. Alternatively, these network interface locations can also be arranged at other transit switching centers or, respectively, at originating and destination switching equipment.

Having set forth the basic structure of the packet switching network PVN1 as well as the coupling thereof to the packet switching network PVN2, the method of the invention shall now be discussed in greater detail. To that end, it is assumed as an example, that a virtual connection is to be set up between the subscriber equipment DTE11 and DTE21. For this call setup, a call request corresponding to CCITT Recommendation X.25 is transmitted from the calling subscriber equipment DTE11 to the switching equipment V1. Address information which identifies the subscriber equipment DTE21 as the called subscriber equipment is contained in an address field of this call request. A route search for a suitable connecting path within the packet switching network PVN1 to the called subscriber equipment DTE21 then ensues from the switching equipment V1 based on this address information. When such a connecting path is defined, for example by employing the switching equipment V3 and V4, then the rest of the call setup ensues in a known way by exchanging signaling packets between the switching equipment V1 through V4 and the subscriber equipment DTE11 and DTE21. After a successful call setup, the data packets to be transmitted during the course of this connection are then forwarded in a known way within the packet switching network PVN1.

An alternate route is selected through the packet switching network PVN2 when a line disturbance occurs with the afore-mentioned virtual connection. This may occur, for example, due to an interruption of one of the trunks provided between the switching equipment V1 and V2. In the example illustrated in FIG. 1, this interruption occurs between the switching equipment V3 and V4. In order to select an alternate route, the initial virtual connection is cleared. Switching equipment V3 operates in conjunction with the switching equipment V1 and switching equipment V4 operates in conjunction with switching equipment V2 to accomplish clearing of the connection. The calling subscriber equipment DTE11 connected to the switching equipment V1 and the called subscriber equipment DTE21 connected to the switching equipment V2 are not affected by clearing of the connection. Such a partial clearing of the previously established virtual connection is achieved in accordance with the afore-mentioned trunk protocol on the basis of a specific clear request output by either of the switching equipment V3 or V4.

When the clear request is received in the switching equipment V1, it generates a call request that requests the setup of a virtual connection. The address information which identifies the called subscriber equipment (DTE21) which is still retained in the switching equipment V1 is entered into the address field of this call request. This call request is transmitted to the switching equipment V3. The switching equipment V3 recognizes that an alternate route within the packet switching network PVN2 is to be used for the requested call on the basis of the above-assumed line disturbance. In order to select such an alternate route, the call request that has just been received is initially retained, i.e. intermediately stored in the switching equipment V3. In response to this call request, the set up of a separate virtual connection within the second packet switching network PVN2 to the network interface location UE2 is then initiated by the switching equipment V3 via the network interface location UE1. This is done in accordance with the signaling procedure defined for the second packet switching network PVN2. In order to accomplish this, a separate call request is first transmitted to the switching equipment of the packet switching network PVN2 that is connected to the network interface location UE 1. Address information identifying the network interface location UE2 is contained in the address field of this separate call request. The address information is contained in the data base of the switching equipment V3. A route search for a suitable connecting path to the network interface location UE2 then ensues from the corresponding switching equipment, based on this address information contained in the address field. After a connecting path is defined within the packet switching network PVN2, a virtual connection is set up within this packet switching network between the network interface locations UE1 and UE2, i.e. Between the switching equipment V3 and V4. This virtual connection is set up completely in accordance with the signaling procedure employed by the packet switching network PVN2.

After call setup within the packet switching network PVN2 occurs, the call request initially retained in the switching equipment V3 is then inserted into a data packet as useful information if it is of an appropriate length. This data packet is then transmitted via the packet switching network PVN2 to the switching equipment V4 via the virtual connection which has just been setup. The forwarding of this useful packet thus ensues transparently within the packet switching network PVN2. If the length of a data packet is not sufficient for complete transmission of the call request, the call request is segmented. Individual segments are then transparently transmitted within the packet switching network PVN2 in a plurality of data packets as noted.

After depacketing of the received data packet or, respectively, of the received data packets by the switching equipment V4, the latter forwards the call request contained in this data packet or, respectively, in these data packets to the switching equipment V2. In response to this call request, the control events required to setup of a virtual connection between the switching equipment V1 and V2 are sequenced within the switching equipment V2. The switching equipment V2 generates a "call accepted" packet which is supplied to the switching equipment V1 via the previously defined alternate route through packet switching network PVN2, i.e. this call accepted signal is also transparently transmitted within the packet switching network PVN2 in one or more data packets. The renewed set up of a virtual connection between the subscriber equipment DTE11 and DTE21 in this example is thus complete. After this occurs, the transmission of data packets between the subscriber equipment is continued via the alternate route. Here, too, data packets for transmission within the packet switching network PVN2 which initially appear in the packet switching network PVN1 are inserted into data packets of the alternate connection and, thus, are transparently transmitted within the packet switching network PVN2.

In the above-explained example, it may also occur that specific, network-associated performance features were requested for the virtual connection originally set up exclusively within the packet switching network PVN1. Information relating to these performance features which are deposited in the switching equipment V1 are entered into a service field of the call request transparently transmitted within the packet switching network PVN2. The information being entered therein upon definition of an alternate route. Additionally, information relating to the called subscriber equipment such as, for example, address, line number, as well as the virtual channel number which is defined for the virtual connection maintained at the moment on the subscriber line connected to the called subscriber equipment DTE21 is also transmitted in this service field. This information is interpreted in the switching equipment V2 in order—after the complete reestablishment of a virtual connection via the packet switching network PVN2—to transmit data packets to the called subscriber equipment DTE21 under that virtual channel number that was also defined for the previously partially interrupted virtual connection.

By maintaining the virtual connection which had initially been conducted within the packet switching network PVN1 through packet switching network PVN2 in this matter, it is possible that a brief interruption of the virtual connection may result. Consequently, all data packets output from the switching equipment V1 may not be received by the switching equipment V2. In order to prevent loss of data, a transmission counter is kept in the switching equipment V1 and is compared with a reception counter kept in the switching equipment V2. As known, this momentary counter reading corresponds to the sequential number of the data packet most recently transmitted or, respectively, received during the course of the virtual connection. A matching of these momentary counter readings is achieved in the present exemplary embodiment by transmitting information relating to the counter reading of the reception counter kept in the switching equipment V2 to the switching equipment V1 in the afore-mentioned call accepted packet via the alternate route. This information may be located in a user data field of this call accepted packet. The transmission of data packets by the switching equipment V1 is then continued with that data packet whose sequence number corresponds to the counter reading just communicated. When, as a result of the above-explained, partial interruption of the existing virtual connection, all data packets sent by the switching equipment V1 have not arrived in the switching equipment V2, the lost data packets that are still retained in switching equipment V1 are retransmitted to the switching equipment V2.

Additionally, the virtual connection which is conducted via an alternate route through packet switching network PVN2 may be continued within the packet switching network PVN1 when an internal connecting path within packet switching network PVN1 becomes available. Information identifying the fact that a virtual connection is conducted via an alternate route is separately retained in the switching equipment which is used by this virtual connection. In the example described above, this information is contained in the switching equipment V3. When information indicating that the previously down trunk has become operational is sent to this switching equipment, then the above-described virtual connection conducted via the alternate route within the packet switching network PVN2, i.e. Between the switching equipment V1 and V2 in this case, is cleared. The sub-connections existing between the switching equipment and the subscriber equipment participating in the virtual connection, the subscriber equipment DTE11 and DTE21 in this case, are then not affected by this partial clearing. A renewed route search is performed based on the address information still stored in the switching equipment V1 for the called subscriber equipment DTE21. A connecting path within the packet switching network PVN1 is subsequently defined to the switching equipment connected to this called subscriber equipment, the switching equipment V2 in this case, and a corresponding call request is transmitted. This call request contains a service signal with which the switching equipment V2 is informed that a virtual connection already conducted via an alternate route is to be reestablished, i.e. that this call request is not to be transmitted to the called subscriber equipment DTE21. In response to the reception of this call request, the return transmission of a call accepted packet then ensues from the switching equipment V2 in order to again completely reestablish the virtual connection between the subscriber equipment DTE11 and DTE21 that was just partially cleared.

In order to implement such a virtual connection without losses of data packets, the transmission and reception counters kept in the switching equipment V1 and V2 are resynchronized, as already set forth in conjunction with the setup of a virtual connection via an alternate route, in that information regarding the momentary counter reading of the reception counter kept in the switching equipment V2 is again transmitted in the afore-mentioned call accepted packet to the switching equipment V1 and are interpreted in the latter.

Up to now, only the case where data packets are transmitted from a calling subscriber equipment to a called subscriber equipment given an established virtual connection has been considered. Given a bidirectional virtual connection, as is the case given a connection according to CCITT Recommendation X.25, data packets transmitted in the opposite direction are also transparently transmitted in data packets of the alternate route in the above-recited way within the packet switching network PVN2. Furthermore, a transmission counter is kept in the above-explained exemplary embodiment in the switching equipment V2 for this opposite direction and, by contrast, a corresponding reception counter is kept in the switching equipment V1. Given a setup of an alternate route via the packet switching network PVN2 or, respectively, the reestablishment of a virtual connection initially conducted via such an alternate route exclusively within the packet switching network PVN1, details relating to the momentary counter reading of the reception counter that are contained in the respective, afore-mentioned call request, for example in the user data field thereof, are thereby transmitted to the switching equipment V2 in order to achieve resynchronization of the transmission and reception counters on the basis of this information.

In conclusion, let it also be pointed out that an alternate maintaining of a virtual connection across a public packet switching network PVN2 has in fact been set forth above with reference to the example of a virtual connection proceeding between the switching equipment DTE11 and DTE21 of a private packet switching network PVN1. The above-described method, however, can also be applied in general when an established virtual connection is disturbed within an arbitrary packet switching network, for example due to the outage of trunks. All that is necessary is that the packet switching network be in communication with a further packet switching network via network interface locations. Such network interface locations, moreover, can also be provided at originating and destination switching equipment, not only at transit switching equipment, as assumed in the above example.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method for setting up virtual connections between a calling subscriber equipment and a called subscriber equipment, wherein the calling subscriber equipment is connected to a first switching equipment of a first packet switching network and the called subscriber equipment is connected to a second switching equipment of the first packet switching network, a third switching equipment of the first packet switching network is connected to the first switching equipment of the first packet switching network and a fourth switching equipment is connected to the second switching equipment of the first packet switching network, a first network interface location connects the third switching equipment of the first packet switching network to a second packet switching network and a second network interface location connects the second packet switching network to the fourth switching equipment of the first packet switching network, said method comprising the steps of:

transmitting a first call request from the calling subscriber equipment to the first switching equipment of the first packet switching network requesting connection with the called subscriber equipment;

storing address information identifying the second network interface location at the third switching equipment of the first packet switching network;

defining a virtual connection path for the first call request between the third switching equipment of the first packet switching network and fourth switching equipment of the first packet switching network within the first packet switching network;

determining that the virtual connection path between the third and fourth switching equipment of the first packet switching network within the first packet switching network is unavailable;

after determining that the virtual connection path between the third and fourth switching is unavailable, automatically transmitting a second call request from the first network interface location to a first switching equipment of the second packet switching network, the second call request containing the address information identifying the second network interface location;

performing a search for a virtual connection path within the second packet switching network, from the first switching equipment of the second packet switching network to the second network interface location; and creating a virtual connection between the first and second network interface locations within the second packet switching network.

2. The method of claim 1, wherein at least one of the third and fourth switching equipment is transit switching equipment.

3. The method of claim 1, further comprising the step of transmitting data packets within the second packet switching network from the calling subscriber equipment to the called subscriber equipment via the virtual connection between the first and second network interface locations.

4. The method of claim 3, wherein at least one of the transmitted data packets is a segmented data packet.

5. The method of claim 1, further comprising the additional steps of:

determining when a connection path within the first packet switching network from the third switching equipment of the first packet switching network to the fourth switching equipment of the first packet switching network becomes available; and creating a virtual connection within the first packet switching network from the third switching equipment of the first packet switching network to the fourth switching equipment of the first packet switching network.

6. The method of claim 1, comprising the additional step of:

comparing a transmission counter reading associated with the third switching equipment of the first packet switching network with a reception counter reading associated with the fourth switching equipment of the first packet switching network.

7. The method of claim 1, wherein the first packet switching network is a private packet switching network.

8. The method of claim 1, wherein the second packet switching network is a public packet switching network.

9. A method for maintaining a virtual connection between a calling subscriber equipment and a called subscriber equipment, wherein the calling subscriber equipment is connected to a first switching equipment of a first packet switching network and the called subscriber equipment is connected to a second switching equipment of the first packet switching network, a first network interface location connects the first switching equipment of the first packet switching network to a second packet switching network and a second network interface location connects the second packet switching network to the second switching equipment of the first packet switching network, said method comprising the steps of:

setting up a virtual connection path between the first and second switching equipment of the first packet switching network within the first packet switching network;

determining that the virtual connection path between the first and second switching equipment of the first packet switching network is unavailable;

transmitting a first call request from the first switching equipment of the first packet switching network to the first network interface location;

retaining the first call request at the first network interface location;

transmitting a second call request from the first network interface location to a first switching equipment of the second packet switching network, the second call request containing address information identifying the second network interface location;

performing a search for a connection path within the second packet switching network from the first network interface location to the second network interface location;

setting up a virtual connection between the first and second network interface locations within the second packet switching network; and transmitting the retained first call request via the virtual connection within the second packet switching network to the second switching equipment of the first packet switching network.

10. The method of claim 9, wherein at least one of the first and second switching equipment is transit switching equipment.

11. The method of claim 9, further comprising the step of transmitting data packets within the second packet switching network from the calling subscriber equipment to the called subscriber equipment via the virtual connection between the first and second network interface locations.

12. The method of claim 11, wherein at least one of the transmitted data packets is a segmented data packet.

13. The method of claim 9, further comprising the additional steps of:

determining when a connection path within the first packet switching network from the first switching equipment of the first packet switching network to the second switching equipment of the first packet switching network becomes available; and creating a virtual connection within the first packet switching network from the first switching equipment of the first packet switching network to the second switching equipment of the first packet switching network.

14. The method of claim 9, comprising the additional step of:

comparing a transmission counter reading associated with the first switching equipment of the first packet switching network with a reception counter reading associated with the second switching equipment of the first packet switching network.

15. The method of claim 9, wherein the first packet switching network is a private packet switching network.

16. The method of claim 9, wherein the second packet switching network is a public packet switching network.

* * * * *